US008635279B2

(12) United States Patent
Cassanego et al.

(10) Patent No.: US 8,635,279 B2
(45) Date of Patent: Jan. 21, 2014

(54) ESTABLISHING AND RECOVERING CONTEXT RELATED TO AN ON-GOING SEQUENCE OF COMMUNICATIONS

(75) Inventors: Dante Cassanego, Mountain View, CA (US); Michael J. Power, San Jose, CA (US); Craig L. Zarmer, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 827 days.

(21) Appl. No.: 12/061,009

(22) Filed: Apr. 2, 2008

(65) Prior Publication Data

US 2009/0252314 A1     Oct. 8, 2009

(51) Int. Cl.
*G06F 15/16*     (2006.01)
*H04M 15/00*     (2006.01)
*H04M 3/00*     (2006.01)
*H04M 1/56*     (2006.01)

(52) U.S. Cl.
USPC .. 709/205; 379/134; 379/265.09; 379/142.02

(58) Field of Classification Search
USPC ......................................................... 709/205
See application file for complete search history.

(56) References Cited

U.S. PATENT DOCUMENTS

| | | | | |
|---|---|---|---|---|
| 6,011,841 | A * | 1/2000 | Isono ........................ | 379/201.01 |
| 6,665,395 | B1 * | 12/2003 | Busey et al. ............. | 379/265.09 |
| 6,668,276 | B1 * | 12/2003 | Ohkado et al. ................ | 709/217 |
| 6,728,756 | B1 * | 4/2004 | Ohkado ........................ | 709/205 |
| 6,823,054 | B1 * | 11/2004 | Suhm et al. .................... | 379/134 |
| 6,999,990 | B1 * | 2/2006 | Sullivan et al. ............... | 709/205 |
| 7,010,571 | B1 * | 3/2006 | Quatrano et al. ............. | 709/205 |
| 7,334,017 | B2 * | 2/2008 | Hawkes et al. ............... | 709/205 |
| 7,817,792 | B2 * | 10/2010 | Chu ......................... | 379/201.01 |
| 8,503,637 | B1 * | 8/2013 | Kirchhoff et al. ........ | 379/142.02 |
| 2002/0055975 | A1 * | 5/2002 | Petrovykh ..................... | 709/205 |
| 2002/0174182 | A1 * | 11/2002 | Wilkinson et al. ............ | 709/205 |
| 2003/0041108 | A1 * | 2/2003 | Henrick et al. ............... | 709/205 |
| 2003/0055985 | A1 * | 3/2003 | Corb et al. .................... | 709/227 |
| 2005/0160142 | A1 * | 7/2005 | Whitman, Jr. ................ | 709/205 |
| 2008/0148320 | A1 * | 6/2008 | Howcroft ........................ | 725/61 |

\* cited by examiner

*Primary Examiner* — Firmin Backer
*Assistant Examiner* — James Edwards
(74) *Attorney, Agent, or Firm* — Park, Vaughan, Fleming & Dowler LLP

(57) ABSTRACT

Apparatus, methods, and computer program products are disclosed that teach methods for establishing context of a subsequent electronic real-time communication. One method detects a connection attempt that is initiated by an instigator-identifiable for a subsequent electronic real-time communication that is directed to a target-identifiable. The instigator-identifiable is associated with a first identification characteristic and the target-identifiable is associated with a second identification characteristic. This method subsequently retrieves a reminder reference that is responsive to the first identification characteristic and the second identification characteristic and presents the reminder reference to the target-identifiable. The method also establishes the subsequent electronic real-time communication between the instigator-identifiable and the target-identifiable. The disclosed technology also includes apparatus that perform the methods and program products that contain computer instructions that cause a computer to perform the methods when the computer executes the instructions.

3 Claims, 5 Drawing Sheets

ESTABLISHING AND RECOVERING CONTEXT RELATED TO AN ON-GOING SEQUENCE OF COMMUNICATIONS

BACKGROUND

Related Art

PBX or other communication exchange systems (including those provided to the public by telephone companies) generally include functions such as Auto attendant, Auto dialing, Automatic call distributor, Automated directory services, Automatic ring back, Call accounting, Call forwarding on busy or absence, Call park, Call pick-up, Call transfer, Call waiting, Camp-on, Conference call, Custom greetings, Customized Abbreviated dialing (Speed Dialing), Busy Override, Direct Inward Dialing, Direct Inward System Access (the ability to access internal features from an outside telephone line), Do not disturb, Follow-me, Interactive voice response, Music on hold, Night service, Shared message boxes, Voice mail, Voice message broadcasting, Voice paging (PA system), and Welcome Message. These functions are generally accessed by the user of a handset pressing a single or combination of buttons on the handset (for example, vertical service codes) or by using voice commands, etc.

While these services have proven to be very useful, they do not assist the caller or the receiver in refreshing the context of an on-going sequence of communications. Thus, when a subsequent communication related to the on-going sequence of communications is established, time is often lost as one party or the other re-establishes the context of the on-going sequence of communications. Sometimes one party may feel slighted by the other party not immediately remembering the context of the on-going sequence of communications. Furthermore, if the called party cannot immediately recall the context the calling party may perceive that the called party to be unprofessional and/or disorganized. In addition, if the called party's context is incomplete (such that some issue of relevance to the called party is forgotten during the instant communication), an additional subsequent communications may be required to resolve the forgotten issue.

The calling party has the opportunity to recover context prior to instigating a subsequent communication. Thus, that party has the advantage of using existing technology to refresh their context. However, the called party is not given a similar opportunity to prepare for, or refresh the context of the on-going sequence of communications. The called party can approach this problem by, for example, deciding to not directly accept any incoming-call but instead to let such calls roll to voice-mail, and then respond to the voice mail by refreshing context and instigating a return communication. If both parties use the same approach it is difficult to establish an electronic real-time communication between the parties.

When the called party is at his/her workspace another approach is for the called party to assert an interruption suitable for placing the calling party on hold or other delay, then search through paper or computer files to regain context. Yet another approach is to have incoming communications screened by an assistant who can then provide the context to the called party prior to transferring the communication. Still other approaches include creating, for example, a paper memo, an e-mail to self, an audio recording on a voice recorder or via the communication exchange's voice mail service after a communication to capture the current context of the on-going sequence of communications, or other reminder reference with the intent to be able to quickly recover context using the reminder reference for subsequent incoming communications. However, locating the correct reminder reference can take significant time and attention by the called party that delays the establishment of context and increases the time needed by the called party to respond to the calling party.

When the called party is not at his/her workspace (such as in a vehicle) and using a mobile communication device, the above approaches either do not work, are unsafe, or are cumbersome as the called party does not have easy/quick/safe access to any of the reminder references.

Context for the called party can generally be established by being reminded of whom the calling party is, why the calling party is calling, when was the last communication between the parties, whether the calling party was expecting the called party to have performed on an explicit/implicit promise and whether that promise has been completed.

DETAILED DESCRIPTION

The technology described herein teaches methods for establishing context of a subsequent electronic real-time communication. One method detects a connection attempt that is initiated by an instigator-identifiable for a subsequent electronic real-time communication that is directed to a target-identifiable. The instigator-identifiable is associated with a first identification characteristic and the target-identifiable is associated with a second identification characteristic. This method subsequently retrieves a reminder reference that is responsive to the first identification characteristic and the second identification characteristic and presents the reminder reference to the target-identifiable. The method also establishes the subsequent electronic real-time communication between the instigator-identifiable and the target-identifiable. The disclosed technology also includes apparatus that perform the methods and program products that contain computer instructions that cause a computer to perform the methods when the computer executes the instructions.

Figure 1:
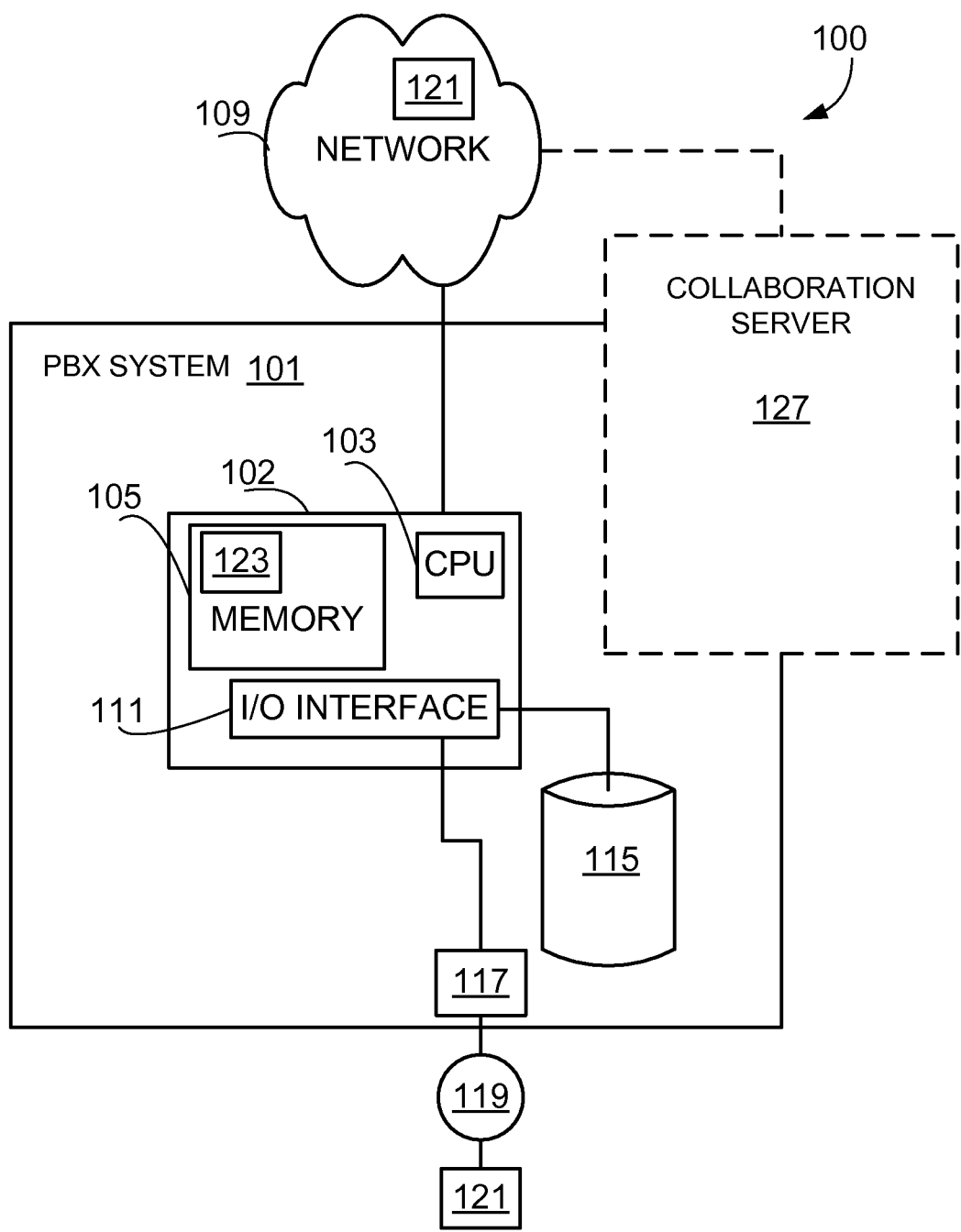
FIG. 1 illustrates a communication exchange in accordance with a preferred embodiment.

FIG. 1 illustrates a networked communication exchange system 100 that can incorporate the disclosed technology. The networked communication exchange system 100 includes a communication exchange 101 that uses a computer 102, which incorporates a CPU 103, and a memory 105. The communication exchange 101 has access to a network 109. The computer 102 can also include an I/O interface 111 that can be connected to a storage system 115, and a removable data device 117. The removable data device 117 can read a computer-usable data carrier 119 (such as a fixed or replaceable ROM within the removable data device 117 itself (not shown); as well as a computer-usable data carrier that can be inserted into the removable data device 117 itself (such as a memory stick, CD, floppy, DVD or any other tangible media) that typically contains a program product 121. The storage system 115 (along with the removable data device 117), the computer-usable data carrier 119, and (in some cases the network 109) comprise a file storage mechanism. The program product 121 on the computer-usable data carrier 119 is generally read into the memory 105 as a program 123 which instructs the CPU 103 to perform specified operations. In addition, the program product 121 can be provided from devices accessed using the network 109. A collaboration server 127 can be part of the communication exchange 101 or accessed by the communication exchange 101 over the network 109. The collaboration server 127 can access a business or personal data server (not shown) that can be executing business management applications such as Intuit Inc.'s QuickBooks® Software.

One skilled in the art will understand that the network propagates information (such as data that defines a computer program). Signals can be propagated using electromagnetic signals, visible or invisible light pulses, signals on a data bus, or signals transmitted over any wire, wireless, or optical fiber technology that allows information to be propagated from one point to another. Programs and data are commonly read from both tangible physical media (such as those listed above) and from the network 109. Thus, the network 109, like a tangible physical media, can be a computer-usable data carrier. One skilled in the art will understand that not all of the displayed features of the communication exchange 101 or the computer 102 need to be present for all embodiments that implement the techniques disclosed herein. Further, one skilled in the art will understand that computers are ubiquitous within modern communication exchange devices, handset devices, cell phones, speaker phones, and conferencing systems, etc.

The technology disclosed herein can be used with, for example but without limitation, a suitably modified PBX or similar phone switch/communication exchange, a VoIP enabled system, etc. The communication exchange can be deployed at a home, or business, or as a third-party service such as a telephone/cell phone service provider. The disclosed technology can be integrated with other business support applications (for example Intuit Inc.'s QuickBooks® software) to provide supplemental information about the other party (as an example, whether the other party has a past-due account).

Figure 2:
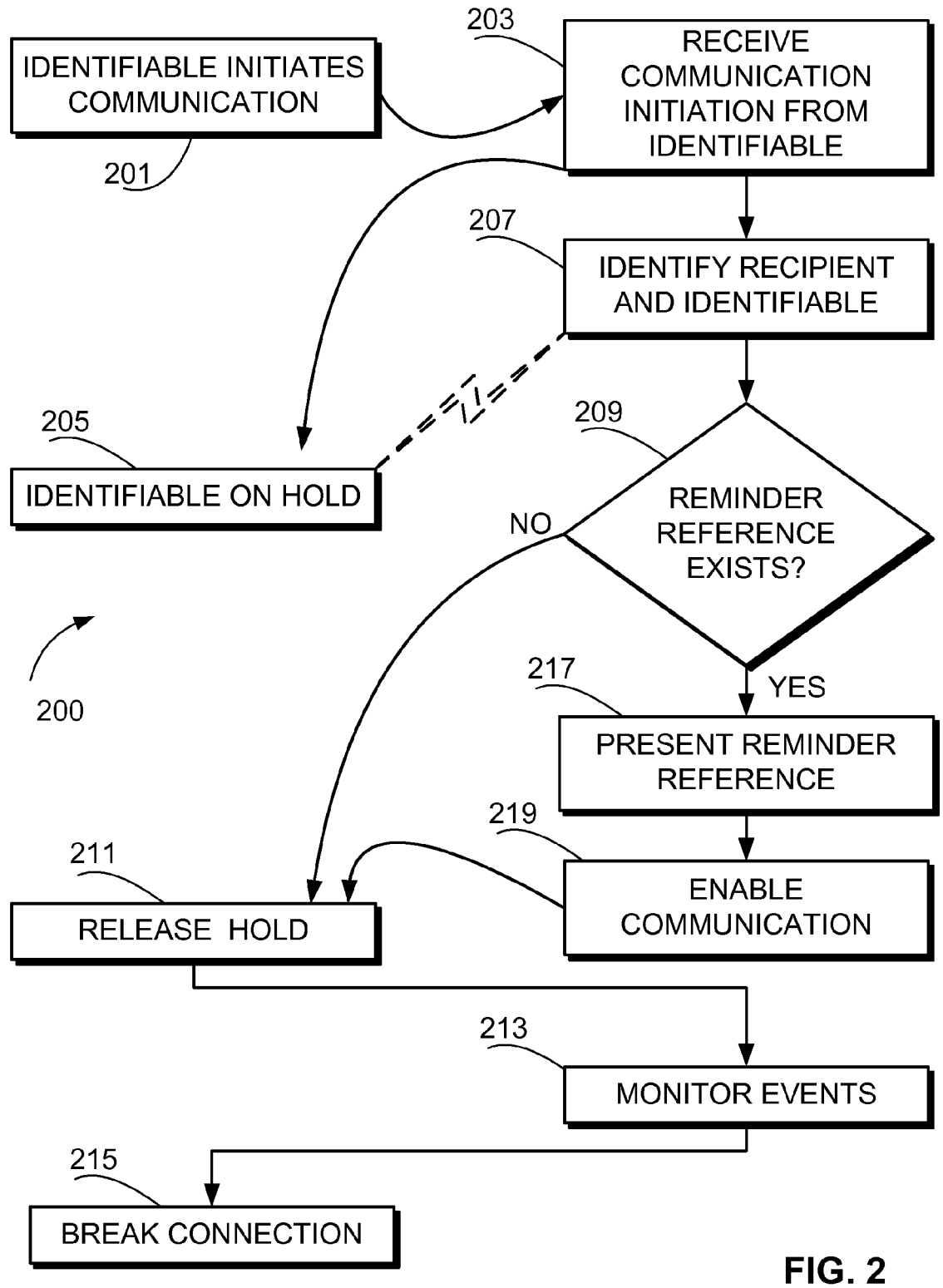
FIG. 2 illustrates an explanatory connection protocol graph that represents one embodiment of the disclosed technology.

FIG. 2 is an explanatory connection protocol graph 200 that illustrates the concepts of the technology disclosed herein. At an 'initiator communication initiation' state 201 an instigator-identifiable (for example, within telephony, the calling party) initiates a connection attempt for an electronic real-time communication with a target-identifiable (for example, within telephony, the called party). The target-identifiable's communication exchange detects the attempted connection from the instigator-identifiable and enters a 'recipient received connection request' state 203 that accepts the attempted connection. Once the connection is accepted the communication enters an 'identifiable hold' state 205 that results in the connection from the instigator-identifiable being placed on hold or otherwise made subject to a delay (optionally presenting a message to the instigator-identifiable related to the delay such as is commonly used with call waiting systems). At substantially the same time, the communication exchange enters an 'identify participants' state 207 that captures identification characteristics suitable for identifying the instigator-identifiable and the target-identifiable. In some implementations, the 'identify participants' state 207 can interact with the instigator while the communication is in the 'identifiable hold' state 205 to obtain, correct, or supplement the identification characteristic used to establish the instigator-identifiable (as indicated by the unlabeled dashed communication symbol between the 'identifiable hold' state 205 and the 'identify participants' state 207).

The instigator-identifiable refers to the entity that has instigated the current communication and has provided some identification characteristic that distinguishes one instigator-identifiable from another instigator-identifiable (for example but without limitation, identification characteristics used to distinguish the instigator-identifiable can be one or any combination of the instigator's caller-ID, separately entered personal identification number (PIN), tracking number, customer number, order number, extension number, e-mail address, instant message address, etc., as well as the result of voice recognition or other biometric identification processing, etc.). The target-identifiable refers to the entity that is the intended recipient of the communication. The identification characteristics for the target-identifiable can be for example but without limitation, one or any combination of a direct dial number called by the instigator-identifiable, a person associated with a PIN (customer number, order number, extension number, etc.) entered by the instigator-identifiable to enable service for the instigator-identifiable, etc. Each identifiable operates a device such as a handset, headset, cell phone, PDA, computer, desktop phone, etc. In the description herein, when it is not relevant whether an act is performed by the instigator-identifiable or the target-identifiable the act is performed by an identifiable. These acts can specify an operation by voice, gesture, input of text, selection of vertical service codes, as well as an operation selected from a graphical user interface, etc.

Once the identification characteristics are determined, the communication exchange enters a 'reminder reference exists decision' state 209 that determines from the identification characteristics of the identifiables whether a reminder reference (or other supplemental information such as account status related to the instigator-identifiable) exists that relates to the instigator-identifiable and the target-identifiable pair. If no reminder reference (or other supplemental information) exists, the communication exchange enters a 'release identifiable hold' state 211 that releases the instigator-identifiable from the 'identifiable hold' state 205 and the communication exchange connects the instigator-identifiable with the target-identifiable to establish the electronic real-time communication. During the electronic real-time communication the communication exchange is in a 'monitor communication' state 213 that monitors the communication for events resulting from acts of the identifiables (for example but without limitation, key command (and/or vertical service codes) events, call termination event, communication clearing event, and the like—whether by an act of utterance, pressing keys on a keypad, selection of an option provided by a GUI, etc.). Eventually, the 'monitor communication' state 213 detects a call termination or communication clearing event and the communication exchange enters a 'break connection' state 215. During the 'break connection' state 215 the direct communication between the instigator and the target-identifiable is broken and either or both the instigator-identifiable and the target-identifiable (separately) can create post communication reminder references as is subsequently described with respect to FIG. 4. One skilled in the art will understand how to detect and process events.

However, if the 'reminder reference exists decision' state 209 determines that a reminder reference exists (such as if the reminder reference was stored after (or during) a previous electronic real-time communication between the identifiables; which implies that the current real-time communication is a subsequent electronic real-time communication with respect to a previous electronic real-time communication for which the reminder reference was created), the communication remains in the 'identifiable hold' state 205, and the communication exchange enters a 'present reminder reference' state 217. The 'present reminder reference' state 217 can announce the instigator-identifiable and present the reminder reference (and/or supplemental information)—that was identified responsive to the pair-wise identification characteristics of the identifiables—to the target-identifiable to re-establish the context of an on-going sequence of communications between the identifiables. Once the reminder reference has been presented to the target-identifiable, the communication exchange enters an 'enable communication' state 219 that places the communication in the 'release identifiable hold' state 211 such that the instigator-identifiable is released from hold and enables electronic real-time communication between the identifiables as previously described (but now with the target-identifiable aware of the context).

In some implementations of the communication exchange the 'present reminder reference' state 217 can be configured to query the target-identifiable with regards to whether and/or how much of the reminder reference (and/or supplemental information) is to be presented. In some implementations, the amount of time taken to present the reminder reference (and/or supplemental information) can be limited to help manage caller satisfaction. These limits can be responsive to the state of the instigator-identifiable's account status, level-of-importance the target-identifiable has placed on the instigator-identifiable, and the like.

One skilled in the art will understand that the 'reminder reference exists decision' state 209 can also be configured to query a database (or accounting application, support application, tracking application, etc.) to extract and present supplemental information that is extraneous to the on-going sequence of communications but related to the instigator-identifiable and that may be of use to the target-identifiable. Thus there may be multiple reminder references from different sources that can be presented (or offered to be presented) to the target-identifiable when in the 'present reminder reference' state 217.

One skilled in the art, after reading the description herein, will understand how to implement the explanatory connection protocol graph 200 in hardware, software, or combination thereof without undue experimentation. Subsequent figures and their related descriptions provide process diagrams from which such a one would be able to generate representative connection protocol graphs.

Figure 3:
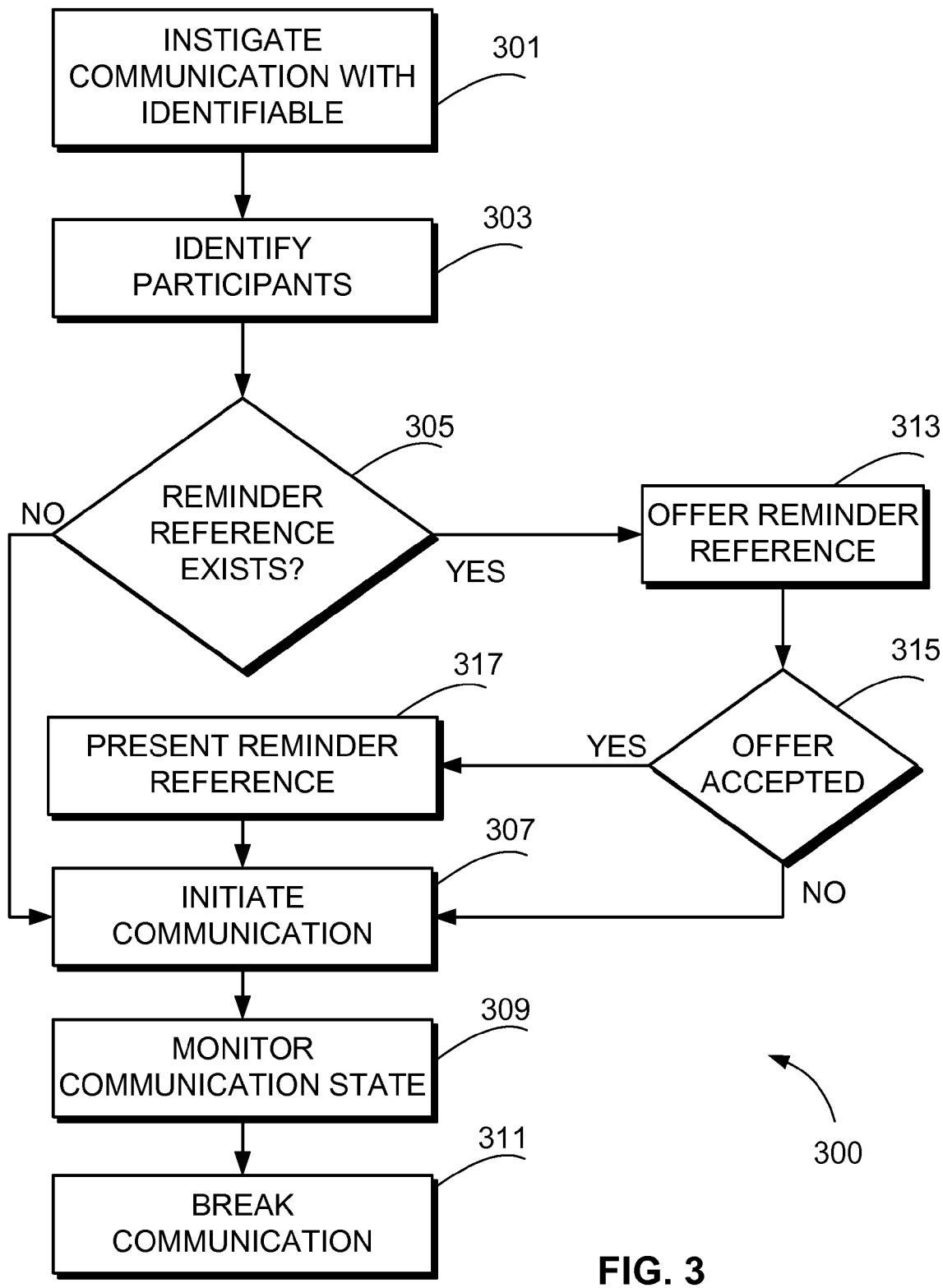
FIG. 3 illustrates an outgoing communication process.

Other implementations of the previously described technology can also be used by the instigator-identifiable when initiating a communication. FIG. 3 illustrates an outgoing communication process 300 that can be implemented in the communication exchange used by the instigator-identifiable. An 'instigate communication' procedure 301 can be invoked by an act of the instigator-identifiable. This invocation can be automatic (for example, resulting from the instigator-identifiable dialing a telephone number) or responsive to a command (such as a voice command, a vertical service code, dedicated button press, etc.). The instigator-identifiable's communication exchange captures identification characteristics for the target-identifiable and instigator by an 'identify participants' procedure 303. Next a 'reminder reference exists' decision procedure 305 determines whether a reminder reference exists that matches the pair-wise identification characteristics. If such a reminder reference does not exist, the outgoing communication process 300 continues to an 'initiate communication' procedure 307 that initiates communication between the instigator-identifiable and the target-identifiable.

During the communication, a 'monitor communication state' procedure 309 monitors the communication for events (for example but without limitation, key command (and/or vertical service codes) events, call termination event, communication clearing event, and the like—whether by an act of utterance, pressing keys on a keypad, selection of an option provided by a GUI, etc.). Once a termination or communication clearing event is detected the outgoing communication process 300 continues to a 'break communication' procedure 311 that terminates the electronic real-time communication and provides the instigator-identifiable with the opportunity to record a reminder reference for that communication as is subsequently described with respect to FIG. 4.

However, if the 'reminder reference exists' decision procedure 305 determines that a reminder reference does exist for the identifiables, the outgoing communication process 300 continues to an 'offer reminder reference' procedure 313 that offers to replay the reminder reference to the instigator-identifiable prior to initiating the communication connection with the target-identifiable. An 'offer accepted' decision procedure 315 determines whether the instigator-identifiable desires the reminder reference to be presented and if so continues to a 'present reminder reference' procedure 317 to present the reminder reference to the instigator-identifiable. After the reminder reference is presented, the outgoing communication process 300 continues to the 'initiate communication' procedure 307 for processing as previously described. If the instigator-identifiable does not so desire, at the 'offer accepted' decision procedure 315 the outgoing communication process 300 continues to the 'initiate communication' procedure 307 for processing as previously described.

The 'present reminder reference' procedure 317 need not (but may) be time limited because no connection with the target-identifiable is initiated until after the reminder reference has been presented (if the offer was accepted). Furthermore, the 'present reminder reference' procedure 317 can also provide the instigator-identifiable with capabilities to select which of the reminder references to present (for example, all of, some of, or most current of the reminder references), to select the presentation speed, to fast forward, rewind, skip silence, etc.

Figure 4:
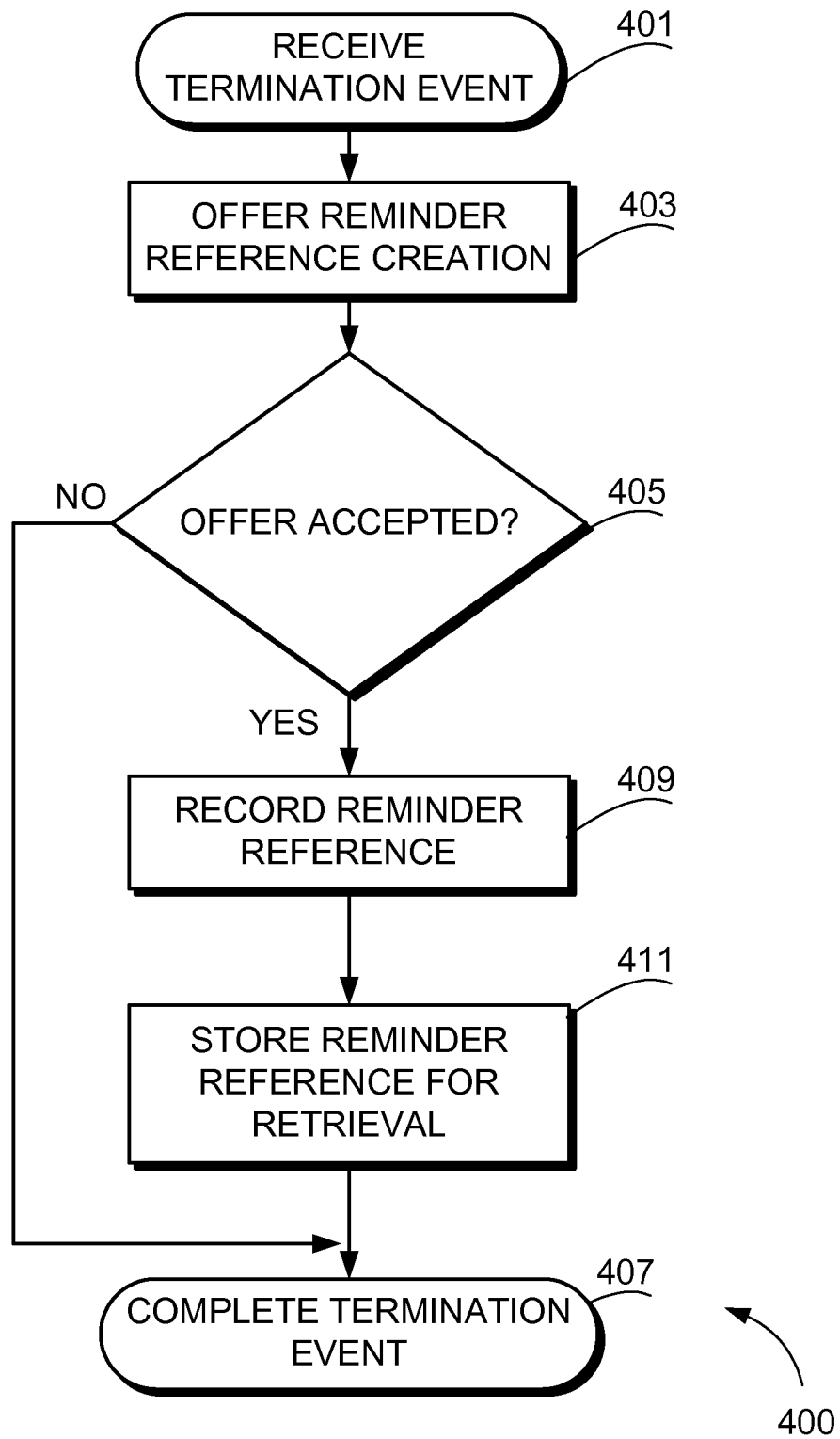
FIG. 4 illustrates a break communication process.

FIG. 4 illustrates a break communication process 400 that can be, for example, invoked by the 'break communication' procedure 311 after detection of a call termination, a communication clearing event, communication clearing event or as a consequence of an electronic real-time communication entering the 'break connection' state 215. The break communication process 400 can be implemented by the communication exchange (or communication exchange enhancement) and can be applied separately to the instigator-identifiable and/or the target-identifiable dependent on the capabilities of the communication exchange used by the respective identifiable.

The break communication process 400 initiates at a 'receive termination event' terminal 401 and continues to an 'offer reminder reference' procedure 403 that offers the reminder reference recording option to the identifiable. Once the offer is made to the identifiable, the break communication process 400 continues to an 'offer accepted' decision procedure 405 that determines whether the identifiable has accepted or rejected the offer. If the identifiable rejected the offer, the break communication process 400 continues to a 'complete termination event' terminal 407 to complete the identifiable's interaction with the communication exchange and to complete any clearing or termination of the electronic real-time communication that may be needed.

However, if the identifiable accepts the offer at the 'offer accepted' decision procedure 405, the break communication process 400 continues to a 'record reminder reference' procedure 409 that records or otherwise captures the identifiable's utterance or textual reminder reference and when complete (some implementations that capture utterances provide the identifiable with capability to re-record, review, edit and other capabilities commonly associated with voice-mail enabled communication exchanges), a 'store reminder reference' procedure 411 electronically stores the reminder reference such that it can be retrieved again by a pair-wise application of the identifiables' identification characteristics. Once the reminder reference is stored, the break communication process 400 completes through the 'complete termination event' terminal 407 as previously described.

The 'record reminder reference' procedure 409 can be implemented to accept one or more of utterances via an audible input, textual input, instant message input, e-mail input, etc. from the identifiable. One version of the technology prompts the identifiable for an utterance and/or text input while the communication device used by the identifiable is still active. Another implementation sends an e-mail or instant message to the identifiable after the electronic real-time communication to prompt the identifiable to create a textual reminder reference or to invoke a function of the communication exchange 101 such that the identifiable can record an utterance as a verbal reminder and associate it with the pair-wise index of the identification characteristics. One skilled in the art will understand that textual messages can be presented in an audible manner to the target-identifiable using well-known text-to-speech technology as well as presented by displaying the text. In addition, speech-recognition technology can be used to convert utterances in a verbal reminder reference to text that can also be presented.

Another aspect of the technology is that some implementations allow an identifiable to interface to the database of reminder references through a web-browser so that the identifiable can use a more complete and/or user-friendly interface to access/update the reminder references or their association with the pair-wise index of the identification characteristics.

One skilled in the art will understand that the identifiable can specify preferences to disable reminder reference creation, to always record reminder references with or without offer and acceptance, as well as other identifiable preferences that relate to the disclosed technology.

Figure 5:
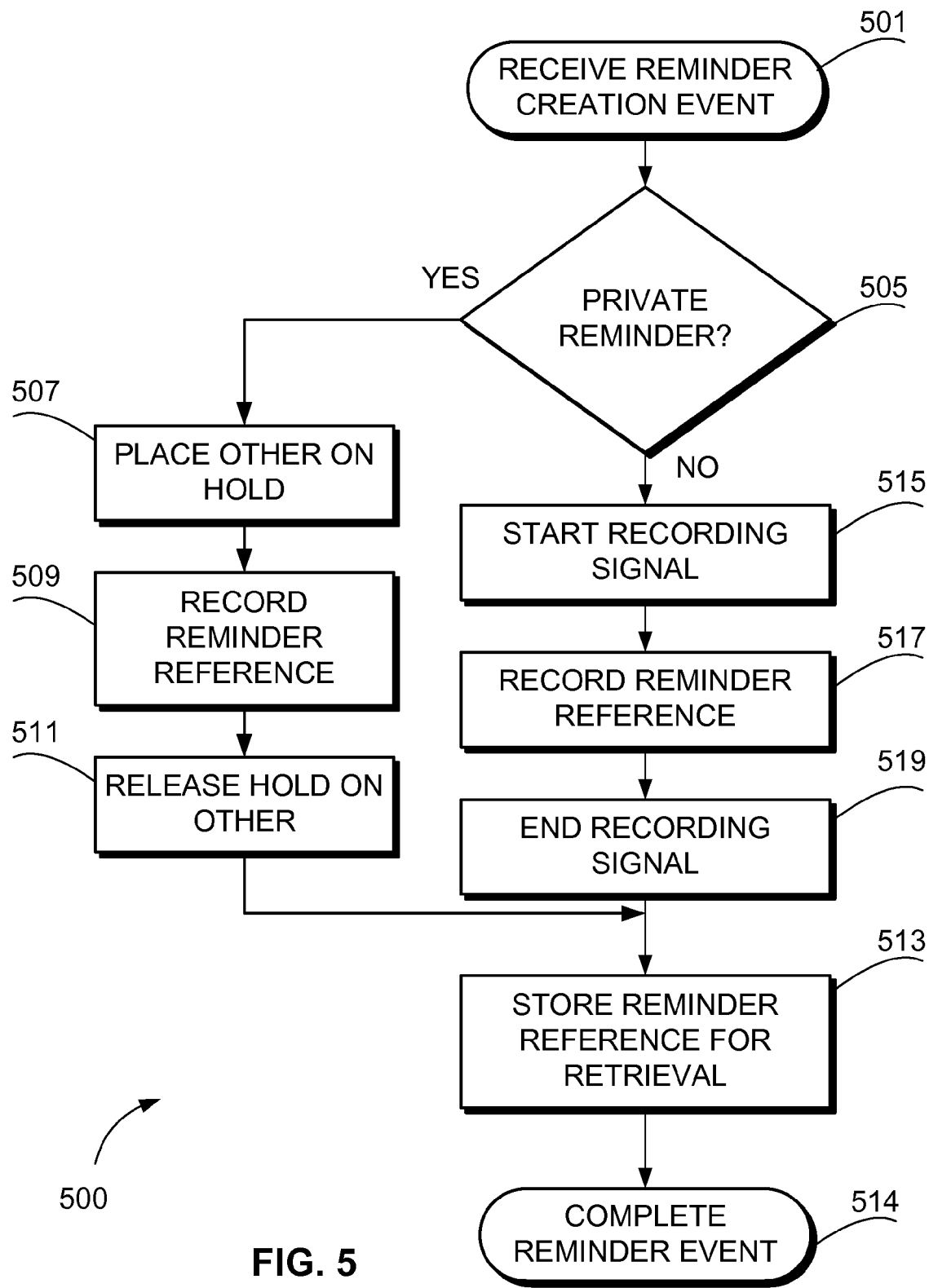
FIG. 5 illustrates a concurrent reminder reference creation process.

FIG. 5 illustrates a concurrent reminder reference creation process 500 that allows a reminder reference to be recorded during the electronic real-time communication. One way to enable this capability is to monitor for a reminder event in the 'monitor communication' state 213 and/or the 'monitor communication state' procedure 309 for acts, by either of the identifiables, directed to the communication exchange (for example, input of vertical service codes, hold command button press, voice commands, etc.) and when the reminder event is detected, invoking the concurrent reminder reference creation process 500. Once invoked, the concurrent reminder reference creation process 500 initiates at a 'receive reminder reference creation event' terminal 501 that receives the reminder event and then continues to a 'private mutual note' decision procedure 505. The 'private mutual note' decision procedure 505 determines whether the reminder reference is to be private (that is, that the other identifiables will not hear or participate in the creation of the reminder reference). This determination can be made responsive to the event (such as by how the reminder reference creation command was invoked), or by the communication exchange prompting the identifiable to specify whether the reminder reference is to be private.

If the reminder reference is to be private the concurrent reminder reference creation process 500 continues to a 'place hold' procedure 507 that places the other identifiable(s) on hold or other delay. Once the other identifiable(s) are on hold, the concurrent reminder reference creation process 500 continues to a 'record reminder reference' procedure 509 that provides the identifiable who caused the reminder event with the capability to record the reminder reference as has been previously described. Once the reminder reference creation is completed, the concurrent reminder reference creation process 500 continues to a 'release hold' procedure 511 to enable the other identifiable(s) to continue to participate in the electronic real-time communication. A 'store reminder reference' procedure 513 can then make (in a manner similar to that of the 'store reminder reference' procedure 411) the reminder reference retrievable by the identifiable who initiated the event and indexed as well by the other identifiable(s) (this can include creating pair-wise indices for the identifiable who initiated the event with each of the other participants in the electronic real-time communication). Once the reminder reference is stored and indexed, the concurrent reminder reference creation process 500 continues to a 'complete event' terminal 514 that completes the event processing.

However, if the 'private mutual note' decision procedure 505 determines that the reminder reference is not to be private, the concurrent reminder reference creation process 500 can continue to a 'start recording signal' procedure 515 that causes a "recording beep" notification to be periodically emitted to all of the participants in the electronic real-time communication while a 'record reminder reference' procedure 517 records the electronic real-time communication. Once the reminder reference creation is completed the concurrent reminder reference creation process 500 continues to an 'end recording signal' procedure 519 that disables the "recording beep" and to the 'store reminder reference' procedure 513 for processing as has been previously described.

The recording made by the 'record reminder reference' procedure 509 and the 'record reminder reference' procedure 517 can use all or portions of the voice mail capability of the communication exchange. The 'store reminder reference' procedure 513 can, for example, be implemented to update a database with a reference to the recorded reminder reference and indexed by some unique value responsive to the identification characteristics of the other party(s).

One skilled in the art will understand the one alternative to generating a "recording beep" is that of providing (and recording) a communication to the identifiables that subsequent communications are to be recorded, or by use of jurisdiction-specific rules for notifying identifiables that their communication is being recorded. These implementations can also provide an option for the other participants in the communication to opt-in or opt-out of the recording of the reminder reference.

One skilled in the art will understand that the techniques described above can be used with audio/visual communications as well (such as those provided by Skype Limited and various other video instant messaging systems, video conferencing systems, etc.), and including video without audio. Furthermore, such a one will understand that because the reminder references can be stored in a database that another option for retrieving the reminder reference is that the note is only retrieved by the instigator-identifiable's identification characteristic. Thus for example, anyone in a small company who answers the instigator-identifiable's call to a support (or sales, or other special-purpose) extension can retrieve the context of an on-going sequence of communications related to support that the company has had with that instigator-identifiable.

One skilled in the art will also understand that there are many ways to implement the disclosed technology and that there are many equivalent implementations that can vary from the specific ordering of the programmed procedures as represented by the figures. These include using different programming methodologies (for example, object-oriented, procedural, etc., or threaded, interrupt driven, event driven, etc). For example but without limitation, some implementations may spawn a thread to store the reminder reference and thus allow the 'store reminder reference' procedure 513 to not delay the completion of the event through the 'complete event' terminal 514.

As used herein, a procedure is a self-consistent sequence of steps that can be performed by logic implemented by a programmed computer, specialized electronics or other circuitry or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic or combination of the foregoing. In particular, the methods and processes described herein can be implemented with logics such as, for example but without limitation, a communication hold logic, a communication initiation logic, a connection logic, a detection logic, a presentation logic, a query logic, a reminder creation logic, a retrieval logic, a storage logic, an acceptance logic, an announcement logic, an event logic, an offer logic, an option logic, etc.

One skilled in the art will understand that the network carries information (such as informational data as well as data that defines a computer program). The information can also be propagated using a carrier-wave. Signals capable of propagating the information includes electromagnetic signals, visible or invisible light pulses, signals on a data bus, or signals propagated over any wire, wireless, or optical fiber technology that allows information to be transmitted over a network. Programs and data are commonly read from both tangible physical media (such as a compact, floppy, or magnetic disk) and from a network. Thus, the network, like a tangible physical media, can be a computer-usable data carrier.

One skilled in the art will understand that the technology provides a quick, easy, timely way to capture and refresh the context of an on-going sequence of communications between identifiables.

From the foregoing, it will be appreciated that the technology has (without limitation) the following advantages:

1) It provides the ability for a cell phone user (or other mobile user) to quickly refresh the context of an on-going sequence of communications just prior to accepting a telephone call from another participant of the on-going sequence of communications.

2) It provides the ability for a caller to refresh the context of an on-going sequence of communications after specifying a phone number of another party but prior to the connection to the other party being initiated.

3) It provides the ability for a person to create a reminder reference during an electronic real-time communication either privately or in collaboration with the other participants in the electronic real-time communication.

4) It provides the ability to access the reminder references through a client-server interface such as a web browser.

5) It provides the ability for others who were not part of the electronic real-time communication to share and collaborate about the context.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed follows:

1. A computer controlled method for establishing context of an electronic real-time voice communication, said method comprising:

detecting an event in a first electronic real-time voice communication between a calling party and a called party;
   querying the called party to determine if a reminder reference will be created as public or private;
   receiving a response to the query from the called party;
   if the response to the query indicates that a public reminder reference will be created, creating the reminder reference without placing the calling party on hold;
   if the response to the query indicates that a private reminder reference will be created:
      placing the calling party on hold,
      creating the reminder reference responsive to the event in the first electronic real-time voice communication, and
      releasing the calling party from hold;
   storing the reminder reference for subsequent retrieval;
   detecting a subsequent connection attempt initiated by the calling party to the called party for a second electronic real-time voice communication;
   retrieving the reminder reference associated with the first electronic real-time voice communication;
   audibly presenting the reminder reference to the called party; and
   responsive to the reminder reference being presented, establishing the second electronic real-time voice communication between the calling party and the called party.

2. A non-transitory computer-readable storage medium storing instructions that when executed by a computer cause the computer to perform a method for establishing context of an electronic real-time voice communication, said method comprising:

detecting an event in a first electronic real-time voice communication between a calling party and a called party;
   querying the called party to determine if a reminder reference will be created as public or private;
   receiving a response to the query from the called party;
   if the response to the query indicates that a public reminder reference will be created, creating the reminder reference without placing the calling party on hold;
   if the response to the query indicates that a private reminder reference will be created:
      placing the calling party on hold,
      creating the reminder reference responsive to the event in the first electronic real-time voice communication, and releasing the calling party from hold;
storing the reminder reference for subsequent retrieval;
detecting a subsequent connection attempt initiated by the calling party to the called party for a second electronic real-time voice communication;
retrieving the reminder reference associated with the first electronic real-time voice communication;
audibly presenting the reminder reference to the called party; and
responsive to the reminder reference being presented, establishing the second electronic real-time voice communication between the calling party and the called party.

3. An apparatus, comprising:
a processor; and
a non-transitory computer-readable storage medium storing instructions that, when executed by the processor, cause the apparatus to perform a method for establishing context of an electronic real-time voice communication, said method comprising:
   detecting an event in a first electronic real-time voice communication between a calling party and a called party;
   querying the called party to determine if a reminder reference will be created as public or private;
   receiving a response to the query from the called party;
   if the response to the query indicates that a public reminder reference will be created, creating the reminder reference without placing the calling party on hold;
   if the response to the query indicates that a private reminder reference will be created:
     placing the calling party on hold,
     creating the reminder reference responsive to the event in the first electronic real-time voice communication, and
     releasing the calling party from hold;
   storing the reminder reference for subsequent retrieval;
   detecting a subsequent connection attempt initiated by the calling party to the called party for a second electronic real-time voice communication;
   retrieving the reminder reference associated with the first electronic real-time voice communication;
   audibly presenting the reminder reference to the called party; and
   responsive to the reminder reference being presented, establishing the second electronic real-time voice communication between the calling party and the called party.

\* \* \* \* \*